US007361625B2

(12) United States Patent
Nakano et al.

(10) Patent No.: US 7,361,625 B2
(45) Date of Patent: Apr. 22, 2008

(54) PHOTOCATALYST PRODUCING METHOD, PHOTOCATALYST, AND GAS PURIFIER

(75) Inventors: Katsuyuki Nakano, Fukuoka-ken (JP); Eiko Higashi, Fukuoka-ken (JP); Masanori Nanri, Fukuoka-ken (JP)

(73) Assignee: Sundecor Co., Ltd (JP)

( * ) Notice: Subject to any disclaimer, the term of this patent is extended or adjusted under 35 U.S.C. 154(b) by 315 days.

(21) Appl. No.: 10/784,348

(22) Filed: Feb. 23, 2004

(65) Prior Publication Data

US 2004/0213900 A1    Oct. 28, 2004

(30) Foreign Application Priority Data

Feb. 24, 2003   (JP) .............. 2003-046340

(51) Int. Cl.
*B01J 21/00*   (2006.01)
*B01J 21/04*   (2006.01)
*B01J 23/42*   (2006.01)
*B01J 23/44*   (2006.01)
*B01J 23/00*   (2006.01)

(52) U.S. Cl. .............. 502/262; 502/236; 502/239; 502/242; 502/326; 502/327; 502/332; 502/334; 502/339; 502/350; 502/351; 502/439; 502/527.12; 502/527.13

(58) Field of Classification Search .......... 502/236, 502/239, 242, 259, 261, 262, 326, 327, 332–335, 502/337, 339, 350, 351, 439, 527.12, 527.13, 502/338

See application file for complete search history.

(56) References Cited

U.S. PATENT DOCUMENTS

| | | | | |
|---|---|---|---|---|
| 3,470,019 A * | 9/1969 | Steele | .......... | 502/326 |
| 3,573,038 A * | 3/1971 | Jung et al. | .......... | 502/301 |
| 3,591,649 A * | 7/1971 | Kroll et al. | .......... | 585/267 |
| 3,697,445 A * | 10/1972 | Carter et al. | .......... | 502/234 |
| 3,821,123 A * | 6/1974 | Germanas et al. | .......... | 502/222 |
| 4,076,792 A * | 2/1978 | Foster et al. | .......... | 423/213.5 |
| 4,160,745 A * | 7/1979 | Murrell et al. | .......... | 502/185 |
| 4,350,613 A * | 9/1982 | Nishino et al. | .......... | 502/200 |
| 4,977,129 A * | 12/1990 | Ernest | .......... | 502/330 |
| 5,073,658 A * | 12/1991 | Saleh et al. | .......... | 585/530 |
| 5,145,825 A * | 9/1992 | Deeba et al. | .......... | 502/242 |
| 5,272,125 A * | 12/1993 | Weible et al. | .......... | 502/242 |
| 5,650,051 A * | 7/1997 | Wada et al. | .......... | 204/157.52 |
| 6,136,186 A * | 10/2000 | Gonzalez-Martin et al. | .......... | 210/198.1 |
| 6,180,548 B1 * | 1/2001 | Taoda et al. | .......... | 501/137 |
| 6,368,668 B1 * | 4/2002 | Kobayashi et al. | .......... | 427/376.2 |
| 6,409,928 B1 * | 6/2002 | Gonzalez et al. | .......... | 210/748 |
| 6,586,361 B1 * | 7/2003 | Heidemann et al. | .......... | 502/353 |

(Continued)

*Primary Examiner*—Cam N. Nguyen
(74) *Attorney, Agent, or Firm*—Andrus, Sceales, Starke & Sawall, LLP (57) ABSTRACT

A carrier supporting titania thereon is further caused to carry a metal compound thereon. This metal compound is hydrogen reduced in a heating atmosphere at a first treatment temperature, then oxidized in a heating atmosphere at a second treatment temperature not higher than the first treatment temperature to thereby obtain a photocatalyst. In this event, metal is released from an extremely strong reduction state and thus highly dispersed on the catalyst in the form of fine particles so that high activity of the catalyst can be obtained. Then, by purifying gas while feeding light and heat to the photocatalyst by, for example, blacklights, a volatile organic compound such as acetaldehyde can be decomposed at a high decomposition rate through cooperation between photocatalytic activity and thermal catalytic activity of the photocatalyst.

9 Claims, 9 Drawing Sheets

U.S. PATENT DOCUMENTS 6,605,733 B2 * 8/2003 Takaya et al. ............... 549/529
6,852,667 B2 * 2/2005 Hibi et al. ................... 502/325

2002/0161250 A1 * 10/2002 Bowman et al. ............ 549/536

* cited by examiner

PHOTOCATALYST PRODUCING METHOD, PHOTOCATALYST, AND GAS PURIFIER

TECHNICAL FIELD

The present invention relates to a method of producing a photocatalyst having a property of exhibiting photocatalytic activity and thermal catalytic activity, and further relates to a photocatalyst produced by such a method, and a gas purifier for decomposing a volatile organic compound (VOC) in the air or the like using such a photocatalyst.

BACKGROUND OF THE INVENTION

In recent years, the environmental problem caused by volatile organic compounds contained in, for example, the air has been worsened. As specific examples thereof, there can be cited a case where it is pointed out that formaldehyde generated from adhesives or preservatives for building materials induces a sick building syndrome in indoor spaces, a case where acetaldehyde generated from, for example, the remainder in food factories causes a bad smell in industrial worlds, and so forth.

Conventionally, the technique has been carried out wherein the air is purified using an air filter including an adsorbent such as activated carbon to thereby adsorb volatile organic compounds. However, in case of the activated carbon, a problem has been pointed out that as the adsorbed organic compounds cover active sites of the activated carbon, its adsorbing activity is gradually lowered. In view of this, there has been proposed a technique of purifying the air by decomposing volatile organic compounds using, as one of purifying means in place of activated carbon, a photocatalyst that is activated when applied with light to exhibit oxidation-reduction activity, i.e. so-called photocatalytic activity.

As one example of the foregoing photocatalyst, there has been known such a photocatalyst composed of titania being titanium oxide having a property of exhibiting photocatalytic activity, and a carrier such as silica carrying titania thereon (hereinafter, this photocatalyst will be referred to as "titania/silica catalyst"). The titania/silica catalyst has a strong oxidation power, while its reduction power is slightly inferior to the oxidation power. It has been known that when platinum (Pt) is further supported on the titania/silica catalyst, there can be obtained a photocatalyst (hereinafter referred to as "platinum-titania/silica catalyst") whose oxidation-reduction activity is further enhanced. (e.g. see Non-patent Literature 1).

When purifying the air containing volatile organic compounds such as acetaldehyde by the use of the foregoing platinum-titania/silica catalyst, light from a light source such as a blacklight is applied to a reactor filled with a layer of photocatalyst to thereby activate the photocatalyst, and simultaneously, the air is fed to the photocatalyst by supply and exhaust means such as a fan. In this event, acetaldehyde is decomposed into, for example, carbon dioxide and water by the photocatalytic activity so that the air is purified.

[Non-patent Literature 1]

E. Obuchi, T. Sakamoto, and K. Nakano, "Photocatalytic Decomposition of Acetaldehyde over $TiO_2/SiO_2$ Catalyst", Chemical Engineering Science 54 (1999), pp. 1525-1530, Mar. 26, 1999

However, there arises a problem that the decomposition of acetaldehyde by the foregoing photocatalyst is insufficient. Specifically, although most of acetaldehyde can be decomposed by the photocatalyst, acetaldehyde may make a human being feel uncomfortable due to its strong offensive smell even if it remains at several tens of ppm. Further, when the catalyst activity is low, there are those instances where acetaldehyde is not decomposed into carbon dioxide and water so that another odor substance such as formic acid or acetic acid being an intermediate substance is produced. Therefore, the fact is that when purifying the air in, for example, an indoor space, the indoor air is circulated to the photocatalyst to lower the concentration of acetaldehyde or the intermediate substance over a certain long time. To this end, there have been demanded techniques that can quickly purify the air at a higher decomposition rate and, as one of them, higher activation of the photocatalyst has been considered.

As another problem, if coke being the so-called remainder produced upon decomposition of acetaldehyde adheres to the surfaces of the catalyst, there are those instances where active sites of the catalyst are covered with the coke so that the decomposition rate of acetaldehyde is lowered. The coke is catalyst poisoning, but can be removed by performing a catalyst recovering process to heat it at, for example, 200 to 400° C. in a heating furnace. However, the gas purification process should be interrupted to take out the photocatalyst from the reactor for performing such a catalyst recovering process, which takes time and labor. Further, in order to maintain the decomposition rate of acetaldehyde at a certain level, frequency of carrying out the catalyst recovering process may be increased to suppress adhesion of the coke on the catalyst surfaces.

SUMMARY OF THE INVENTION

The present invention has been made under these circumstances and has an object to provide a highly active photocatalyst that, for example, can purify gas at a high decomposition rate.

It is another object of the present invention to provide a method of producing such a photocatalyst.

It is still another object of the present invention to provide a gas purifier that can purify gas at a high decomposition rate using such a photocatalyst.

According to one aspect of the present invention, there is provided a method of producing a photocatalyst having a carrier carrying titania and metal with a property of exhibiting thermal catalytic activity, the method comprising a metal carrying step of causing the carrier carrying the titania to carry a compound of the metal; a reduction step of hydrogen reducing, in a heating atmosphere at a first treatment temperature, the compound of the metal carried by the carrier in the metal carrying step; and an oxidation step of oxidizing, in a heating atmosphere at a second treatment temperature, the metal obtained by hydrogen reduction in the reduction step.

According to the photocatalyst producing method of the present invention, the oxidation process is carried out after the hydrogen reduction process so that the metal is released from an extremely strong reduction state, and therefore, the metal in the form of very fine crystals is highly dispersed on the surface of the catalyst. As a result, since thermal catalytic activity by the metal is promoted in addition to photocatalytic activity by titania, the highly active photocatalyst can be obtained.

The second treatment temperature may be equal to or less than the first treatment temperature. The second treatment temperature may fall within a range of 300° C. to 600° C., or within a range of 500° C. to 600° C.

The photocatalyst producing method may further comprise a temperature adjusting step of setting a temperature of the carrier to the second treatment temperature in an inert gas atmosphere after the reduction step.

The metal may be at least one of platinum, rhodium, ruthenium, and nickel. In case of the platinum, the content thereof may fall within a range of 0.04 weight % to 0.5 weight % relative to weight of the photocatalyst.

The content of the titania may be 10 weight % or more relative to the weight of the photocatalyst.

The carrier may be a silica bead.

The photocatalyst producing method may further comprise, prior to the metal carrying step, a step of impregnating into the carrier a first treatment liquid containing titanium tetraisopropoxide and isopropyl alcohol; a step of hydrolyzing a titanium compound impregnated into the carrier to cause the carrier to carry titania; and a step of calcining the carrier carrying the titania.

According to another aspect of the present invention, there is provided a photocatalyst produced by the foregoing photocatalyst producing method.

According to another aspect of the present invention, there is provided a gas purifier for purifying gas containing a volatile organic compound, the gas purifier comprising a reactor filled with the foregoing photocatalyst; light irradiating means for irradiating light on the photocatalyst in the reactor; and supply and exhaust means for feeding the gas to the photocatalyst, wherein a temperature of the photocatalyst upon purifying the gas falls within a range of 100° C. to 200° C.

The volatile organic compound may be at least one of acetaldehyde, formaldehyde, paraffin hydrocarbons, olefin hydrocarbons, and aromatic compounds.

DESCRIPTION OF THE PREFERRED EMBODIMENT

Figure 1:
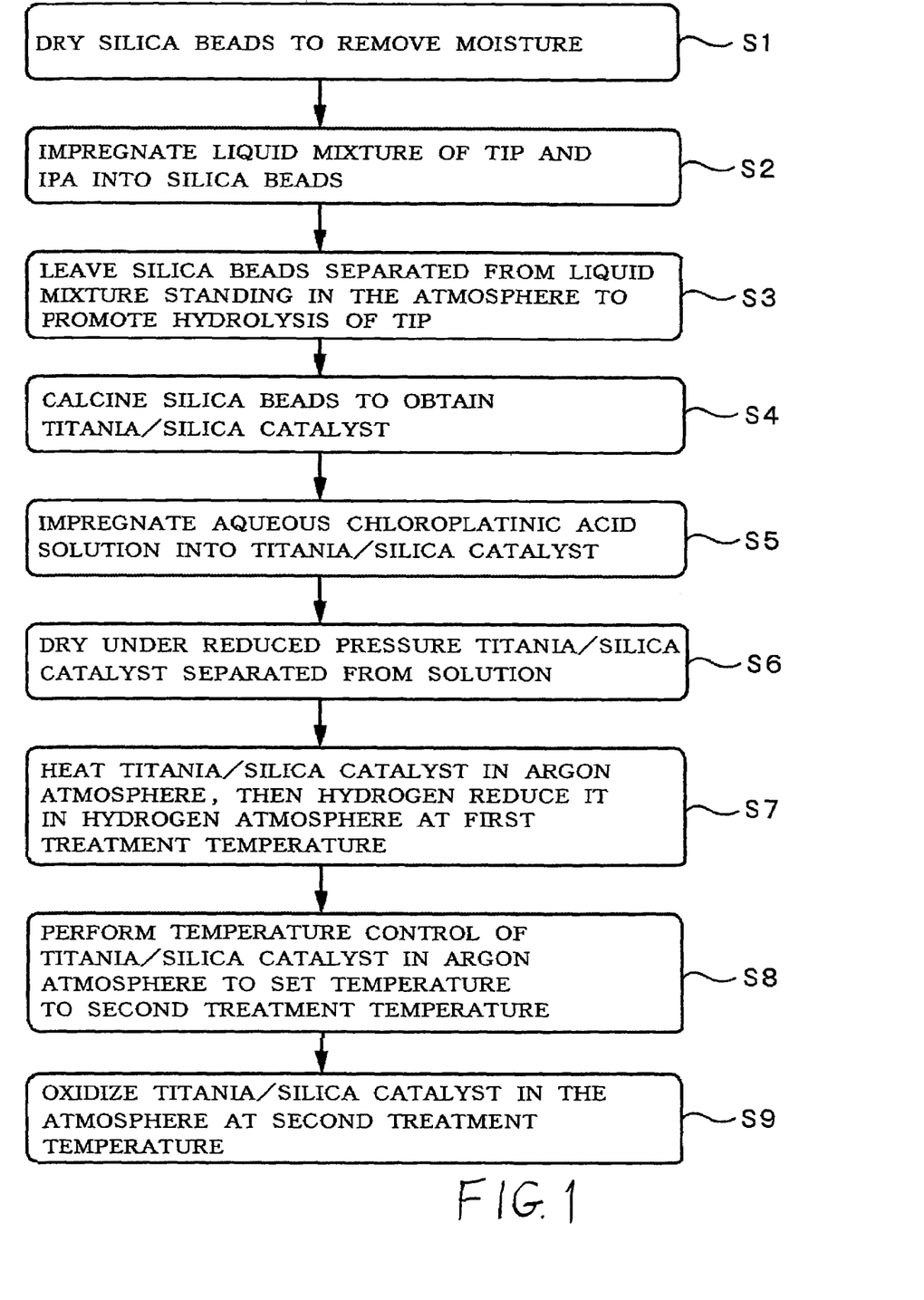
FIG. 1 is a process diagram showing a method of producing a photocatalyst according to a preferred embodiment of the present invention.

Referring to FIG. 1, description will be given about a method of producing a photocatalyst according to a preferred embodiment of the present invention. First, as shown in step S1 in FIG. 1, porous carriers made of, for example, silica such as silica beads having the average particle size of 2 to 4 mm are heated to be dried at, for example, 500° C. to thereby remove moisture. Then, as shown in step S2, a first treatment liquid obtained by mixing together titanium tetraalkoxide, e.g. titanium tetraisopropoxide (TIP), and alcohol, e.g. isopropyl alcohol (IPA) at a predetermined ratio such as in a ratio of 1:1 is impregnated into the silica beads at, for example, normal temperature. This state is kept for, for example, a whole day and night to uniformly spread the first treatment liquid over the surfaces and into fine pores of the silica beads. Thereafter, as shown in step S3, the silica beads are separated from the mother liquid and left to stand in a moist atmosphere such as in the atmosphere to thereby promote hydrolysis of TIP, so that titania ($TiO_2$) is produced. Then, as shown in step S4, the silica beads are calcined, for example, at 500° C. for two hours to thereby obtain a titania/silica catalyst. This titania is, for example, anatase-type crystalline. If the rate of titania supported on silica is low, photocatalytic activity of titania can not be obtained sufficiently, while, if it is too high, the fine pores of the silica beads are blocked to reduce the specific surface area thereof. For this reason, it is desirable to uniformly cover the surfaces of the silica beads with titania. In this embodiment, the content of titania is preferably set to, for example, 10 weight % or more, particularly 10 to 25 weight % relative to the weight of a platinum-titania/silica catalyst obtained afterwards.

Subsequently, as shown in step S5, a second treatment liquid containing a platinum compound such as an aqueous chloroplatinic acid solution is impregnated into the foregoing titania/silica catalyst at, for example, normal temperature. Then, as shown in step S6, the titania/silica catalyst separated from the solution is dried under reduced pressure by the use of, for example, a vacuum drier to thereby remove moisture until the weight of the titania/silica catalyst reaches an approximately constant weight. Thereafter, inert gas such as argon gas is fed to the titania/silica catalyst to heat it in an argon atmosphere. Then, as shown in step S7, when the temperature reaches a first treatment temperature such as 300° C. or higher, preferably 600° C., hydrogen gas is supplied instead of argon gas to carry out a hydrogen reduction process for, for example, two hours in a hydrogen atmosphere so that chloroplatinic acid being the platinum compound is reduced to, for example, platinum. Then, as shown in step S8, argon gas is again supplied instead of hydrogen gas, and a temperature control of the titania/silica catalyst is carried out in an argon atmosphere to set a temperature to a second treatment temperature such as 300 to 600° C., preferably 500 to 600° C. Subsequently, as shown in step S9, the air, for example, is supplied instead of argon gas, and an oxidation process is carried out in the atmosphere for, for example, one hour to thereby obtain a platinum-titania/silica catalyst. Herein, if the rate of supported platinum is too low, catalytic activity of platinum can not be obtained, while, if it is too high, not only photocatalytic activity of titania is lowered, but also it becomes comparatively high in cost. For this reason, it is desirable that the content of platinum be set to, for example, 0.04 to 0.5 weight %, particularly 0.1 weight % relative to the weight of the platinum-titania/silica catalyst obtained afterwards. Incidentally, the oxidation process is not limited to the use of the air, but oxygen gas, ozone gas, or oxidizing gas, for example, may be used.

Now, description will be given below paying attention to the state of the surface of the catalyst upon carrying out the foregoing oxidation process. First, when the hydrogen reduction process prior to the oxidation process is implemented, the platinum compound is reduced to platinum as described above. In this event, observing microscopically, platinum is dispersed on the catalyst in the form of crystals having a raft-shaped crystal structure. Herein, this state is called "extremely strong reduction state". Then, by implementing the oxidation process at the second treatment temperature that is, for example, not higher than the hydrogen reduction process temperature, joining hands in the raft-shaped crystal structure are cut so that platinum now in the form of very fine crystal particles is highly dispersed on the surface of the catalyst. That is, platinum is oxidized in the oxidation process to a degree not transformed into oxide, and released from the foregoing extremely strong reduction state.

Figure 2:
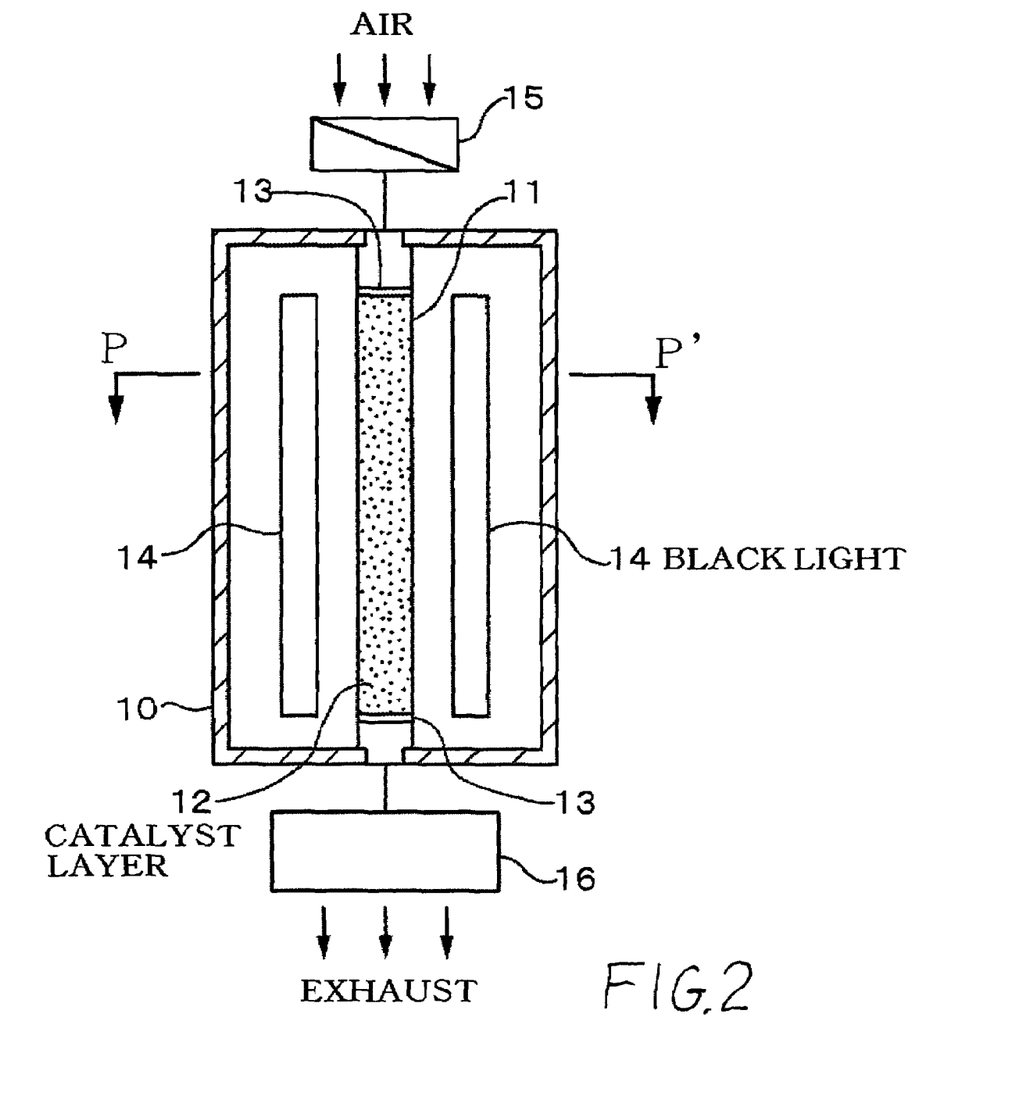
FIG. 2 is a longitudinal sectional view showing a gas purifier according to a preferred embodiment of the present invention.
Figure 3:
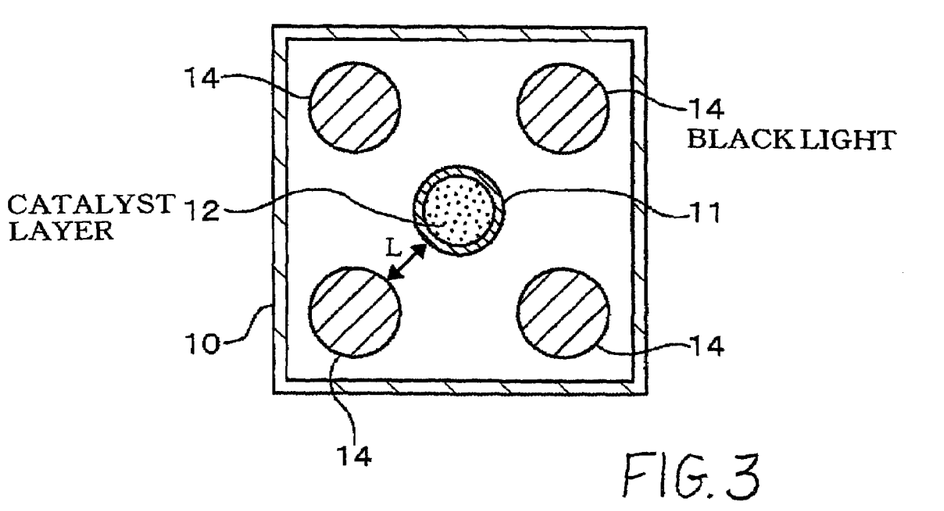
FIG. 3 is a cross sectional view taken along a line P-P' in FIG. 2.

Referring now to FIGS. 2 and 3, description will be given below about a gas purifier for purifying gas containing a volatile organic compound, for example, containing at least one of acetaldehyde, formaldehyde, paraffin hydrocarbons, olefin hydrocarbons, and aromatic compounds, by the use of the platinum-titania/silica catalyst obtained by the foregoing technique. FIG. 2 is a longitudinal sectional view of the gas purifier, while FIG. 3 is a cross sectional view taken along a line P-P' in FIG. 2. In the figures, numeral 10 denotes a housing forming a body portion of the gas purifier. In the housing 10 is provided a reaction tube 11, i.e. a tubular reactor, made of a light-transmittable material at least at a portion thereof and having, for example, a diameter of 10 mm, a thickness of 0.5 mm, and a length of 200 mm. In the reaction tube 11, a photocatalyst obtained by the foregoing technique is filled at a height of, for example, 170 mm to form a catalyst layer 12. The catalyst layer 12 is supported on upper and lower sides thereof by support members 13 each formed with gas flow holes each having a size not allowing the photocatalyst to pass therethrough. The foregoing light-transmittable material is selected from heat resistant glass (trade name: Pyrex Glass), quartz glass, acrylic, polycarbonate, and so forth.

In the housing 10, a plurality of (four in this embodiment) blacklights 14 serving as light sources being light irradiating means for irradiating light including, for example, ultraviolet light are provided so as to surround the reaction tube 11. It is configured that the temperature of the catalyst layer 12 is raised by radiation heat of the blacklights 14 to a purification process temperature such as no higher than a lower limit of an ignition temperature of a later-described coking material and, when gas to be treated contains, for example, acetaldehyde, it is raised to, for example, 100 to 200° C., preferably 150° C. As a specific example, when the blacklights 14 each of 6 W are used, a distance L being a gap between the reaction tube 11 and each blacklight 14 is set to 3 mm. On the upstream side of the reaction tube 11 is disposed a filter 15 for separating suspended solid substances such as dust contained in the gas to be treated, while, on the downstream side of the reaction tube 11 is disposed a fan 16 serving as supply and exhaust means for feeding the gas to be treated to the catalyst layer 12.

When purifying the gas to be treated such as the air containing acetaldehyde by the use of the foregoing gas purifier, the fan 16 is first driven to introduce the air into the filter 15 where suspended solid substances such as dust are separated. Then, the air is fed to the catalyst layer 12. In this event, when light such as ultraviolet light is irradiated on the photocatalyst from the blacklights 14, electrons jump over the band gap of titania to the conduction band thereof so that the photocatalyst is activated. Herein, when acetaldehyde in the air is brought into contact with the surface of the activated photocatalyst, acetaldehyde is decomposed to, for example, carbon dioxide and water, while a secondarily generated coking material and/or coke adheres to the surface of the catalyst. The coking material represents a volatile precursor that becomes coke afterwards. Consequently, active sites of the catalyst are reduced so that the decomposition rate is gradually lowered. However, owing to catalytic combustion reaction of platinum activated by the radiation heat received from the blacklights 14, the coking material is ignited to be burned and further burns even coke located therearound. The burned coking material and/or coke is separated from the surface of the catalyst in the form of, for example, carbonic acid gas. Consequently, the active sites of the catalyst covered with the coking material and/or coke up to then appear again so as to contribute to the decomposition of acetaldehyde. In addition, owing to the combustion heat in this event, the catalytic combustion reaction by platinum is further activated. In this manner, acetaldehyde is decomposed to purify the air. Incidentally, apart from the foregoing reaction, such a reaction is considered to be also generated wherein active oxygen is produced upon contact between the activated photocatalyst, and oxygen and water in the air, and the produced active oxygen and acetaldehyde are reacted with each other to produce carbonic acid gas and water.

According to the foregoing embodiments, during the production of the catalyst, the oxidation process is carried out at the predetermined temperature after the hydrogen reduction process. Therefore, platinum is released from the extremely strong reduction state so that platinum in the form of very fine crystal particles is highly dispersed over the catalyst. Consequently, a power of dissociating oxygen molecules or hydrogen molecules, which is a metallic characteristic of platinum but lost due to being in the form of the raft-shaped crystals, is recovered so that high activity can be achieved. As a result, the catalytic combustion reaction by platinum is promoted to enable ignition of, for example, the coking material. Therefore, as will also be clear from later-described examples, the activity of the catalyst is rapidly enhanced through cooperation between the photo-catalytic activity and the thermal catalytic activity, and can also be maintained high thereafter. Incidentally, the second treatment temperature may be set higher than the first treatment temperature as long as the second treatment temperature is lower than a temperature at which sintering is generated during the production of the catalyst.

Further, according to the foregoing embodiments, the heat is supplied to the photocatalyst from the blacklights 14 as the light sources to carry out the purification process at the predetermined temperature. Therefore, the catalytic combustion reaction of platinum is promoted by this heat to securely cause the ignition of the coking material. Consequently, the coking material and/or the coke adhering to the catalyst is burned to suppress lowering of the activity of the catalyst. As a result, the catalyst recovering process may not be carried out, or the frequency thereof can be largely reduced. Incidentally, if the temperature of the catalyst layer 12, which is the gas purification process temperature, is too high, the coking material is solidified to be the coke so that the ignition thereof becomes difficult. For this reason, it is desirable to execute the control in the state of the coking material being the volatile precursor. Further, it is preferable to determine the purification process temperature depending on the kind of coking material to be produced. In view of this, it is set to the lower limit of the ignition temperature of the coking material in this embodiment as described before.

In the photocatalyst of the present invention, metal supported on the carrier and having the property of exhibiting the thermal catalytic activity is not limited to platinum, but may be one selected from rhodium, ruthenium, palladium nickel, and so forth. Also in this case, the extremely strong reduction state is released by carrying out the oxidation process after the hydrogen reduction process so that a metallic characteristic of the selected metal is recovered, and therefore, it is possible to achieve the same effect as in the foregoing case. Further, in the photocatalyst of the present invention, titania is not limited to the anatase type, but may be of the rutile type or the rutile-anatase type. Moreover, niobium oxide or the like may be supported on the carrier in place of titania as long as it has the property of exhibiting the photocatalytic activity. Furthermore, in the photocatalyst of the present invention, the carrier is not limited to silica, but may be a porous body of, for example, alumina, preferably γ-alumina, diatomaceous earth, plaster, or the like.

In the gas purifier of the present invention, heating means for feeding heat to the photocatalyst may be separately provided. However, in view of the cost of equipment, it is preferable to configure that the light and heat are supplied from the common light source as described above. Further, in the gas purifier of the present invention, the light source is not limited to the blacklight 14, but may be a fluorescent lamp, a UV lamp, a mercury lamp, an ozone lamp, a bactericidal lamp, or the like as long as it emits light in the ultraviolet region. Also in this case, the same effect as in the foregoing case can be achieved.

Figure 4A:
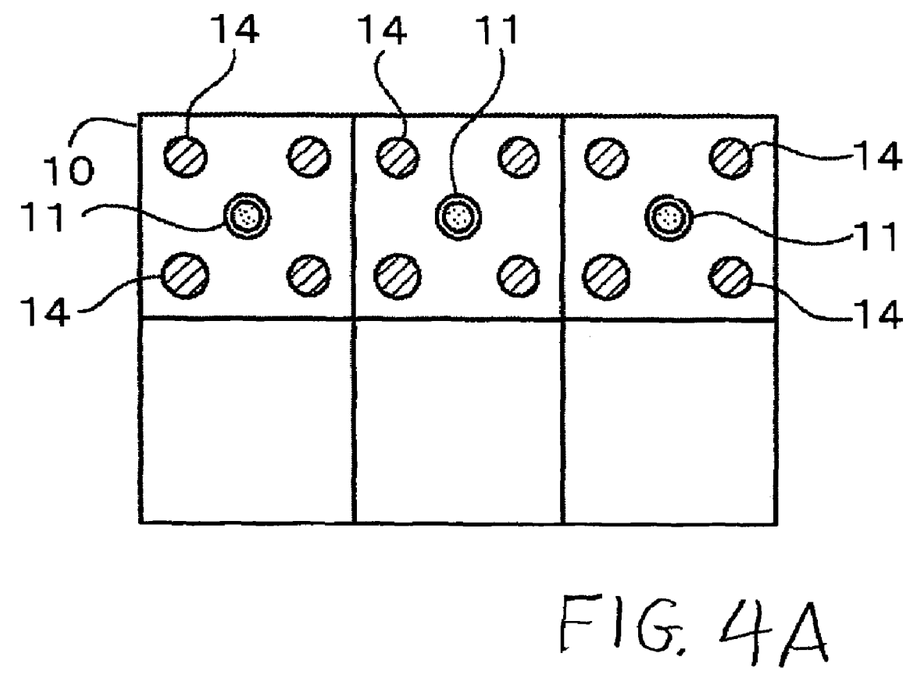
FIG. 4A is a cross sectional view showing a modification of the gas purifier shown in FIGS. 2 and 3.
Figure 4B:
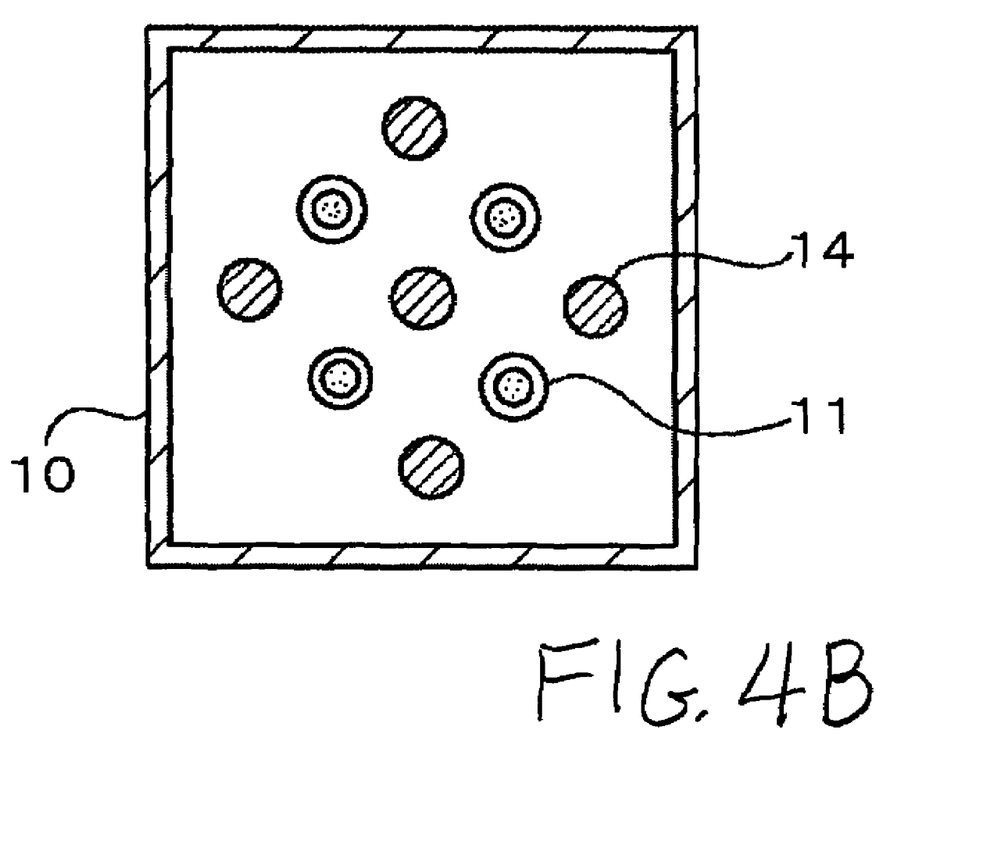
FIG. 4B is a cross sectional view showing another modification of the gas purifier shown in FIGS. 2 and 3.
Figure 4C:
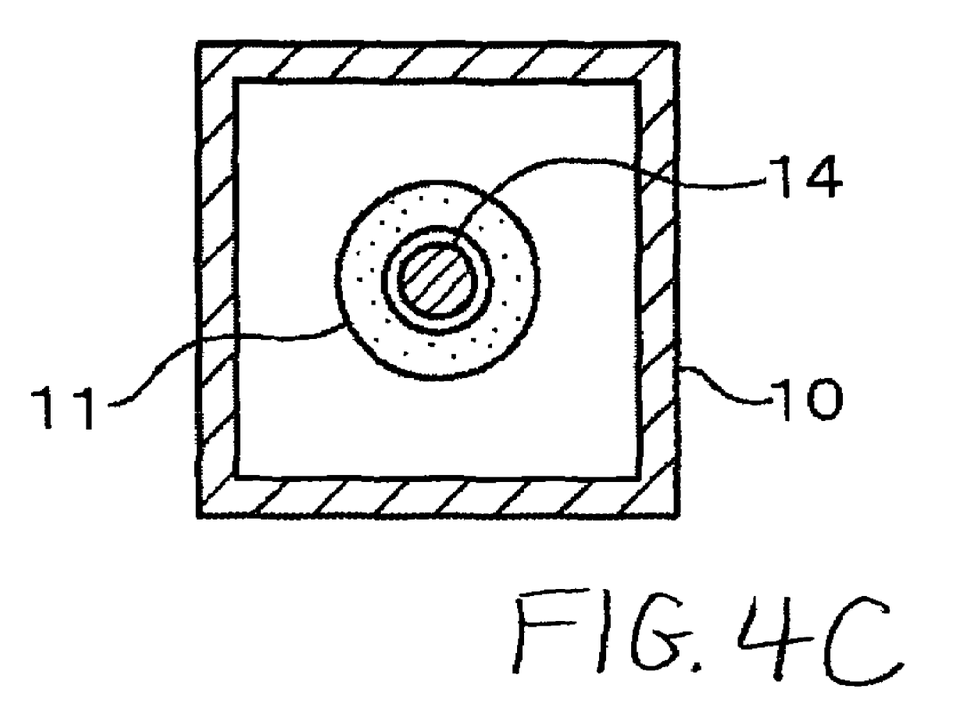
FIG. 4C is a cross sectional view showing still another modification of the gas purifier shown in FIGS. 2 and 3.

Further, in the gas purifier of the present invention, a plurality of reaction units each comprising a reaction tube 11 and blacklights 14 may be provided as shown in FIG. 4A. Further, a plurality of reaction tubes 11 may be provided in the housing 10. One example thereof is shown in FIG. 4B. As appreciated, the present invention is not limited thereto. Preferably, the numbers and arrangement of the reaction tubes 11 and the blacklights 14 are determined depending on the supply flow rate of gas to be treated, the kind of volatile organic compound, the kind of light source, and so forth. Furthermore, the present invention is not limited to the structure wherein the light is irradiated from the exterior of the reaction tube 11. For example, as shown in FIG. 4C, a blacklight 14 may be provided within a reaction tube 11 so as to irradiate light from the inside of the reaction tube 11.

EXAMPLES

Now, description will be given about examples that have been carried out for confirming the effects of the present invention.

Example 1

In this example, a platinum-titania/silica catalyst according to the present invention was produced. As silica carriers, silica beads having the average particle size of 2 to 3 mm and having fine pores with the average pore size of 30 nm (CARiACT30 produced by Fuji Silysia Chemical Ltd.) were used. First, the silica beads were heated to be dried at 500° C., then 100 g thereof were weighed into a beaker. Subsequently, while shaking the beaker with the silica beads therein, a first treatment liquid obtained by mixing TIP and IPA together was gradually dropped into the beaker using a burette, and the beaker was left standing for 24 hours in the state where the silica beads were fully immersed. Thereafter, the silica beads were taken out and calcined in the atmosphere at 500° C. for two hours to thereby obtain a titania/silica catalyst. Subsequently, the titania/silica catalyst was put in a beaker, impregnated with a chloroplatinic acid solution, and left standing for a whole day and night so as to carry 0.1 weight % of platinum, then dried under reduced pressure using a vacuum drier. After the titania/silica catalyst reached an approximately constant weight, it was taken out from the vacuum drier. Then, while feeding argon gas, the catalyst was heated to 600° C. in an argon atmosphere. Then, argon gas was switched to hydrogen gas, and the catalyst was subjected to hydrogen reduction in a hydrogen atmosphere at 600° C. (first treatment temperature) for two hours. Then, hydrogen gas was switched to argon gas, and the catalyst was kept in an argon atmosphere for one hour. Then, argon gas was switched to the air, and the catalyst was subjected to oxidation in the atmosphere at 600° C. (second treatment temperature) for one hour. Thereafter, in an argon atmosphere, the temperature of the catalyst was lowered to thereby obtain a platinum-titania/silica catalyst. This platinum-titania/silica catalyst is called a catalyst A.

Example 2

In this example, the same processes were carried out as in Example 1 except that oxidation was implemented at 500° C. (second treatment temperature), to thereby obtain a platinum-titania/silica catalyst. This platinum-titania/silica catalyst is called a catalyst B.

Example 3

In this example, the same processes were carried out as in Example 1 except that oxidation was implemented at 400° C. (second treatment temperature), to thereby obtain a platinum-titania/silica catalyst. This platinum-titania/silica catalyst is called a catalyst C.

Example 4

In this example, the same processes were carried out as in Example 1 except that oxidation was implemented at 300° C. (second treatment temperature), to thereby obtain a platinum-titania/silica catalyst. This platinum-titania/silica catalyst is called a catalyst D.

Comparative Example 1

In this comparative example, the same processes were carried out as in Example 1 except that oxidation was not implemented, to thereby obtain a platinum-titania/silica catalyst. This platinum-titania/silica catalyst is called a catalyst E.

Description will be given below about tests conducted for measuring the decomposition performance of the catalysts A to E obtained in Examples 1 to 4 and Comparative Example 1. Prior to the description thereof, the condition of a gas purifier used in the tests will be explained. As a reaction tube 11, Pyrex Glass having a diameter of 10 mm, a thickness of 0.5 mm, and a length of 200 mm was used. The photocatalyst was filled in the reaction tube 11 at a height of 170 mm to form a catalyst layer 12. Four blacklights 14 each of 6 W were used as light sources, and a distance L between the reaction tube 11 and each blacklight 14 was set to 3 mm.

(Test 1)

In this test, the decomposition performance of the catalysts A to E obtained in Examples 1 to 4 and Comparative Example 1 was measured for confirming the effect of the oxidation process carried out after the hydrogen reduction. Air having a temperature of 25° C. and containing 3000 vol.ppm acetaldehyde was prepared and brought into contact with the catalyst A (B~E) filled in the reaction tube 11 at a flow rate of 120 ml/min. After confirming adsorption equilibrium, light was irradiated on the catalyst A (B~E) from the blacklights 14 to conduct a decomposition test for 5 to 6 hours. In this event, using gas chromatography, acetaldehyde remaining in the air at an outlet of the catalyst layer 12 was analyzed per interval of about 10 minutes to derive the decomposition rate by calculation. Herein, the decomposition rate represents the rate of acetaldehyde decomposed within the reaction tube 11, and was derived from an expression given by ((inlet concentration (vol.ppm)−outlet concentration (vol.ppm))/(inlet concentration (vol.ppm)))×100.

(Result and Consideration about Test 1)

Figure 5:
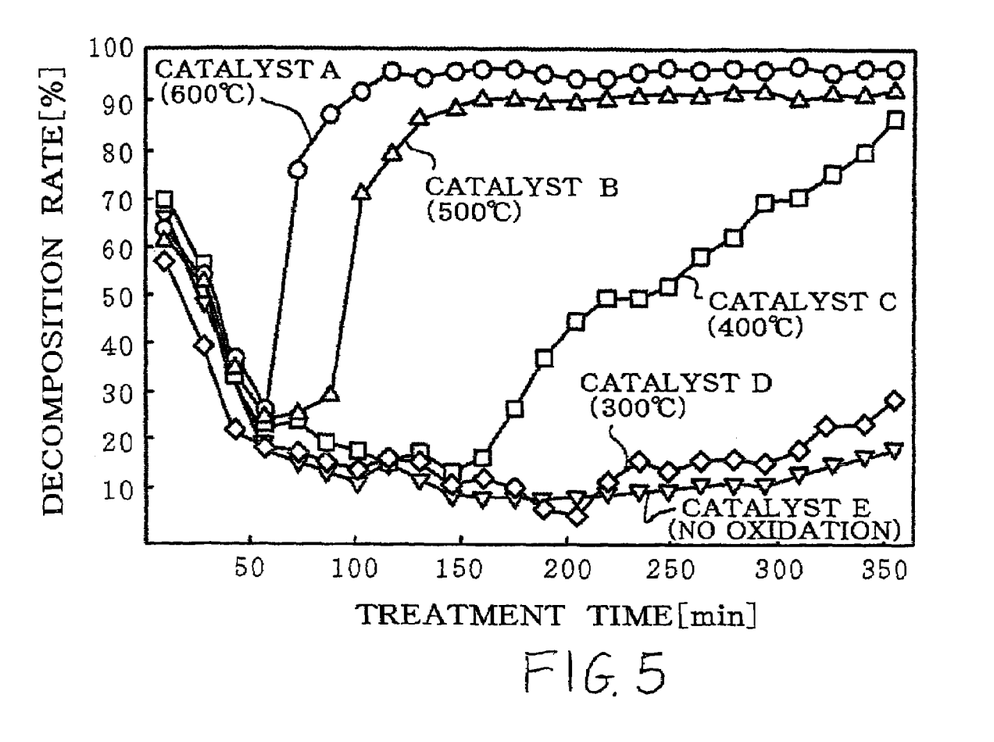
FIG. 5 is a characteristic diagram showing results of a test conducted for confirming an effect of the present invention.

The results on the decomposition rates of the catalysts A to E are shown in FIG. 5. As clear from the results in FIG. 5, the decomposition rates were lowered in all the catalysts A to E up to 50 minutes from the start of the test. However, in the catalyst A, the decomposition rate was rapidly increased from there and exceeded 90% at a lapse of about 100 minutes. The decomposition rate of more than 90% was stably maintained even thereafter, and the average decomposition rate in the stable state was 96.5%. With respect to the catalyst B, the decomposition rate started to rapidly increase at a lapse of about 80 minutes and reached 90% at a lapse of about 150 minutes. Further, like the catalyst A, the decomposition rate was stable thereafter, and the average decomposition rate in the stable state was 92.0%. On the other hand, in case of the catalyst C, the decomposition rate started to increase almost in proportion to a decomposition time at a lapse of about 150 minutes and reached 90% at a lapse of about 350 minutes. In case of the catalyst D, the decomposition rate started to increase at a lapse of about 200 minutes, reached 30% at a lapse of 350 minutes, and finally exceeded 90%. On the other hand, in case of the catalyst E that was not subjected to the oxidation process, the decomposition rate exhibited no rapid rise and the average decomposition rate was about 15% after a lapse of 100 minutes where the decomposition rate was stable. That is, it has been confirmed that the activity of the catalyst can be enhanced by implementing the oxidation process after the hydrogen reduction process. It has been further confirmed that the decomposition rate increases earlier as the oxidation process temperature (second treatment temperature) becomes higher. Further, when the catalyst A was used, the concentration of acetic acid in the air after the treatment was 5 vol.ppm or less. That is, it has been confirmed that production of intermediate reactants is small in amount.

(Test 2)

This test was conducted for confirming an influence of the heat from the light sources. As a photocatalyst, the catalyst A obtained in Example 1 was used. This test was the same as Test 1 except that coolant gas at room temperature was fed to a gap between the reaction tube 11 and the blacklights 14 via a feed path (not shown) to cool the catalyst layer 12.

(Test 3)

This test was conducted for confirming an influence of the light from the light sources. As a photocatalyst, the catalyst A obtained in Example 1 was used. This test was the same as Test 1 except that the outer periphery of the reaction tube 11 was covered with aluminum foil to prevent the light from being applied to the catalyst layer 12.

(Result and Consideration about Test 2 and Test 3)

Figure 6:
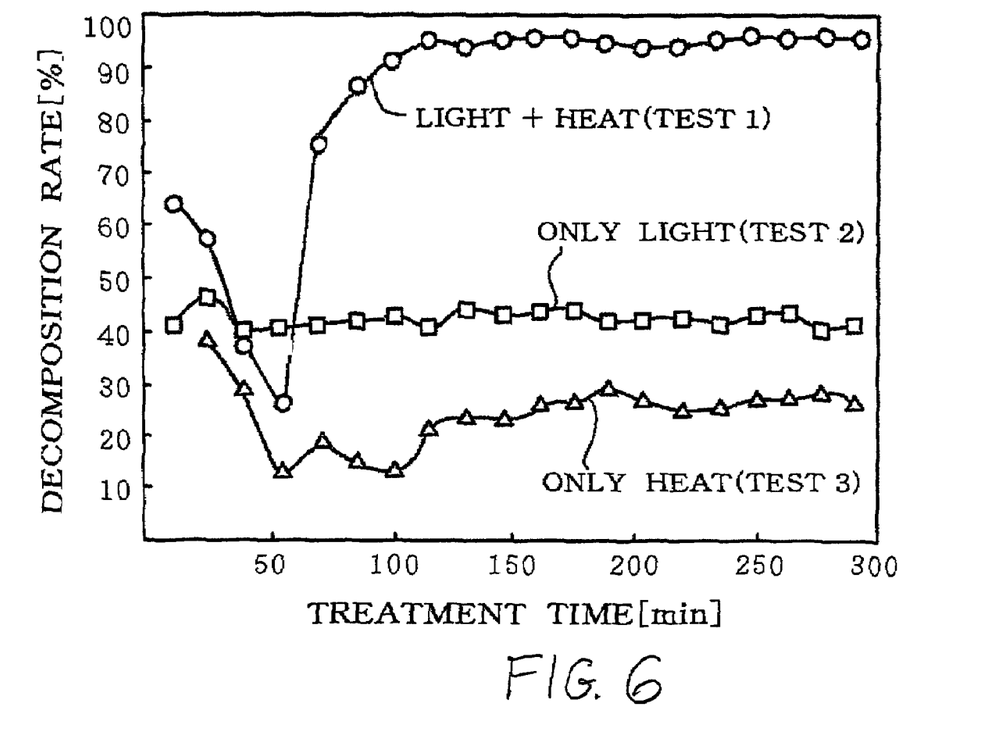
FIG. 6 is a characteristic diagram showing results of tests conducted for confirming an effect of the present invention.

The results on the decomposition rates in Test 2 and Test 3 are shown in FIG. 6. FIG. 6 also shows the foregoing result about the catalyst A in Test 1. In Test 2, the average temperature of the catalyst layer 12 was 48.0° C., and the average decomposition rate in the stable state was 42.6%. In Test 3, the average temperature of the catalyst layer 12 was 144.8° C., and the average decomposition rate in the stable state was 27.2%. On the other hand, as described in Test 1, when both light and heat were supplied, the average decomposition rate in the stable state was 96.5% which exceeded 69.8% (=42.6%+27.2%) obtained by simply adding together the decomposition rate when only the light was supplied, and the decomposition rate when only the heat was supplied. That is, it has been confirmed that, by supplying both light and heat to the catalyst, the higher activity of the catalyst can be achieved by their combined effect.

(Test 4)

In this test, the decomposition test like Test 1 was repeatedly conducted. As a photocatalyst, the catalyst A obtained in Example 1 was used.

(Result and Consideration about Test 4)

Figure 7:
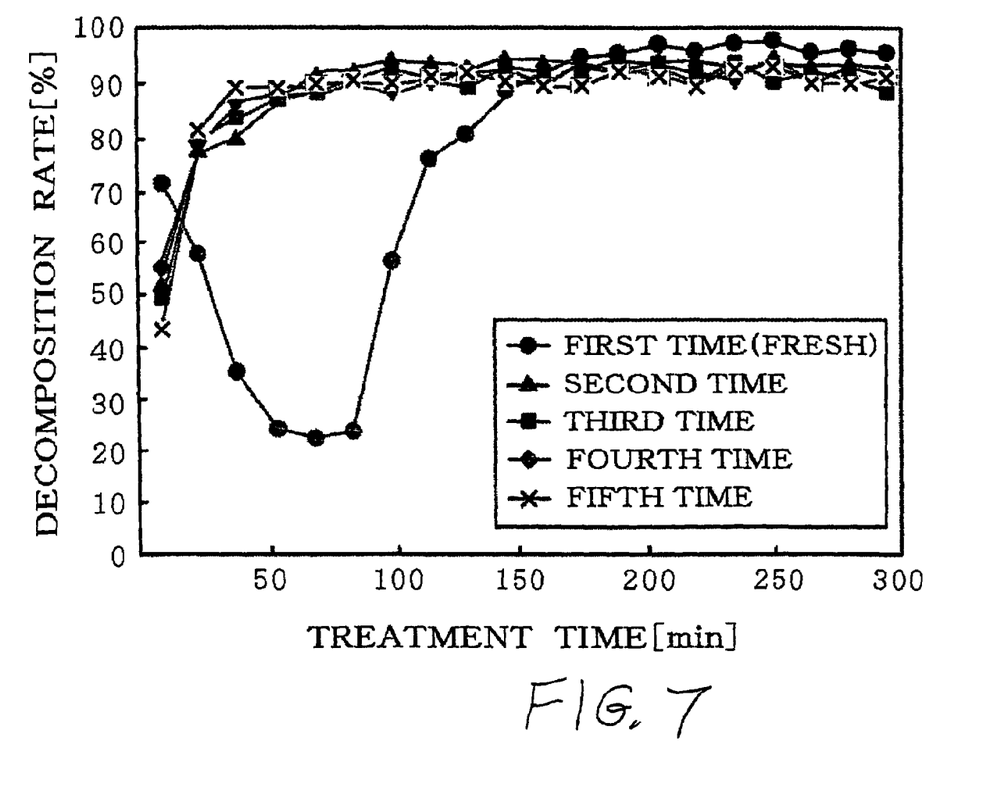
FIG. 7 is a characteristic diagram showing results of a test conducted for confirming an effect of the present invention.

The results on the decomposition rates are shown in FIG. 7. As clear from the results in FIG. 7, the decomposition rate at the second or subsequent time was about 50% at the start, while rapidly increased in an early time zone and reached 80 to 90% at a lapse of 50 minutes. The decomposition rate was stable thereafter and the average decomposition rate in the stable state was 90% or more in case of the second or subsequent time. That is, it has been confirmed that the photocatalyst of the present invention can exhibit high activity even if it is repeatedly used. Consideration is now given to the fact that the transition of the decomposition rate at the first time (Fresh) and the transition of the decomposition rate at the second, third, fourth, or fifth time differ from each other. It is considered that, at the second or subsequent time, a coking material used at the previous time (coke adhered at the first time in case of the second time) remains on the catalyst, and therefore, when the temperature of the catalyst layer 12 rises, ignition of the coking material occurs in an earlier time zone as compared with the first time where the coking material is ignited after accumulated to some degree, which prevents the state where the decomposition rate is once lowered like at the first time.

As described above, according to the present invention, the oxidation process is carried out after the hydrogen reduction process during the production of the catalyst so that platinum in the form of very fine crystal particles is highly dispersed over the catalyst, and therefore, the highly active photocatalyst can be obtained. Further, by applying this photocatalyst to the gas purifier that can feed the light and heat to the photocatalyst from the light source, the ignition of the coking material is prompted to suppress lowering of the activity of the catalyst, and therefore, it is possible to decompose the volatile organic compound in the gas at the high decomposition rate.

What is claimed is:

1. A method of producing a photocatalyst comprising a carrier carrying titania and platinum, said method comprising:

preparing a metal carrying step of causing said carrier carrying the titania to carry a compound of platinum;

reducing the compound of platinum carried on titania by hydrogen, in a heating atmosphere at a first treatment temperature, said compound of platinum carried by said carrier in said metal carrying step; and heating, to a degree not transformed into oxide, in a heating atmosphere containing oxygen at a second treatment temperature, said platinum obtained by hydrogen reduction in said reduction step to thereby make platinum release from an extremely strong reduction state and enhance activity of said platinum.

2. The method according to claim 1, wherein said second treatment temperature is equal to or less than said first treatment temperature.

3. The method according to claim 1, wherein said second treatment temperature falls within a range of 300° C. to 600° C.

4. The method according to claim 1, wherein said second treatment temperature falls within a range of 500° C. to 600° C.

5. The method according to claim 1, further comprising a temperature adjusting step of setting a temperature of said carrier to said second treatment temperature in an inert gas atmosphere after said reduction step.

6. The method according to claim 1, wherein the content of the platinum falls within a range of 0.04 weight % to 0.5 weight % relative to the weight of the photocatalyst.

7. The method according to claim 1, wherein the content of the titania is 10 weight % or more relative to weight of the photocatalyst.

8. The method according to claim 1, wherein said carrier is a silica bead.

9. The method according to claim 1, further comprising, prior to said metal carrying step, a step of impregnating into said carrier a first treatment liquid containing titanium tetraalkoxide and alcohol;

a step of hydrolyzing a titanium compound impregnated into said carrier to cause said carrier to carry titania; and a step of calcining said carrier carrying the titania.

* * * * *